Dec. 4, 1962   A. L. HUBBARD   3,066,466
COTTON SPINDLE CLEANING MEANS
Filed Sept. 22, 1960

INVENTOR.
A. L. HUBBARD
BY William A. Murray
ATTORNEY

United States Patent Office 3,066,466
Patented Dec. 4, 1962

3,066,466
COTTON SPINDLE CLEANING MEANS
Arthur L. Hubbard, Des Moines, Iowa, assignor to Deere & Company, Moline, Ill., a corporation of Delaware
Filed Sept. 22, 1960, Ser. No. 58,609
9 Claims. (Cl. 56—41)

This invention relates to a moistener system used in a cotton harvester. More particularly this invention relates to a fluid control system within the moistener system which effects movement of the fluid between a fluid tank and the moistener mechanism.

It has been conventional to provide moistener mechanism composed of a series of moistener pads which contact the picking spindles of a cotton harvester each time the picking drum rotates about its axis. A fluid is fed from a fluid container or tank into the moistener pads so that the spindles are continuously moistened throughout operation of the harvester.

However, it has become apparent in recent times that due to climatic as well as other conditions of the soil that certain cotton will require heavily moistened pads whereas other cotton will require very little if any moistening of the spindles. In the latter instance, it has been found that mere flushing of the moistener mechanism at the end of the rows and while the cotton harvester is being turned will suffice. Even from day to day the conditions of the cotton will change so that it is desirable in a cotton harvester to have a control system for feeding fluid through the feed lines to the moistener mechanism which may be adjusted to accommodate the various types and kinds of cotton bolls harvested. It is therefore the primary purpose of the present invention to provide a fluid control system between a fluid supply or tank in a moistener mechanism on a cotton harvester which may be adjusted to either shut off the flow of fluid except at the end of rows and when the cotton harvesting units are raised, or which may be adjusted to operate continuously as the harvester is operating in its harvesting function.

It is further proposed to provide in the control mechanism means for automatically operating the various valves which are responsive to various functions of the harvester to automatically put into operation the desired flow of fluid.

Other objects and advantages of the present invention will become apparent to those skilled in the art as the nature of the invention is better understood from the following description and as shown in the accompanying drawings.

The cotton harvester herein referred to is of the type generally shown and described in U.S. Patent 2,719,394, which issued to F. A. Thomann and R. H. Meier. Similarly, the basic moistener arrangement is of the type shown in U.S. Patent 2,795,096, which issued to R. H. Meier. Since details of the cotton harvester and moistener are shown and described in these patents, details of such will not be repeated in the present application. Consequently, the description of the harvester as well as the moistener mechanisms will be only general and in such detail as is necessary to understand the present invention.

Figure 1:
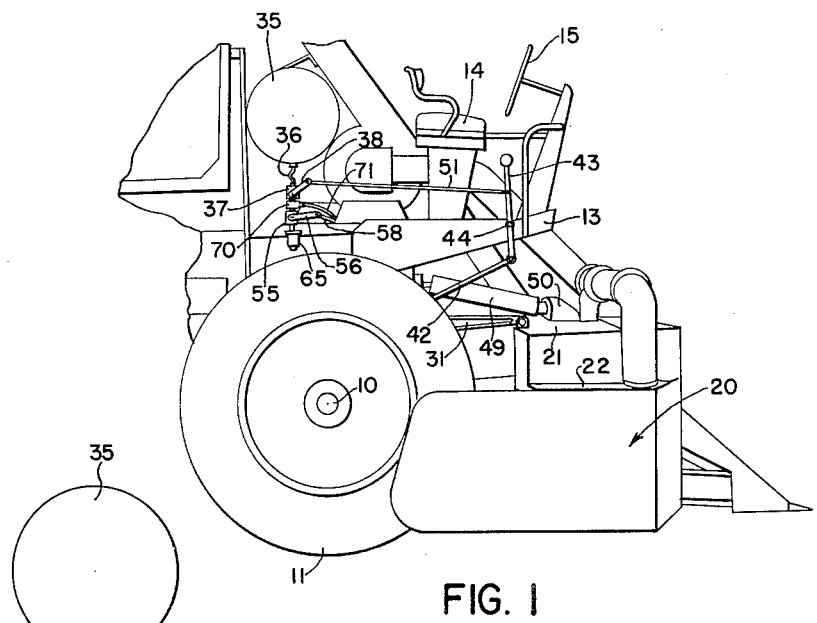
FIG. 1 is a side perspective view of a forward end of a cotton harvester.
Figure 2:
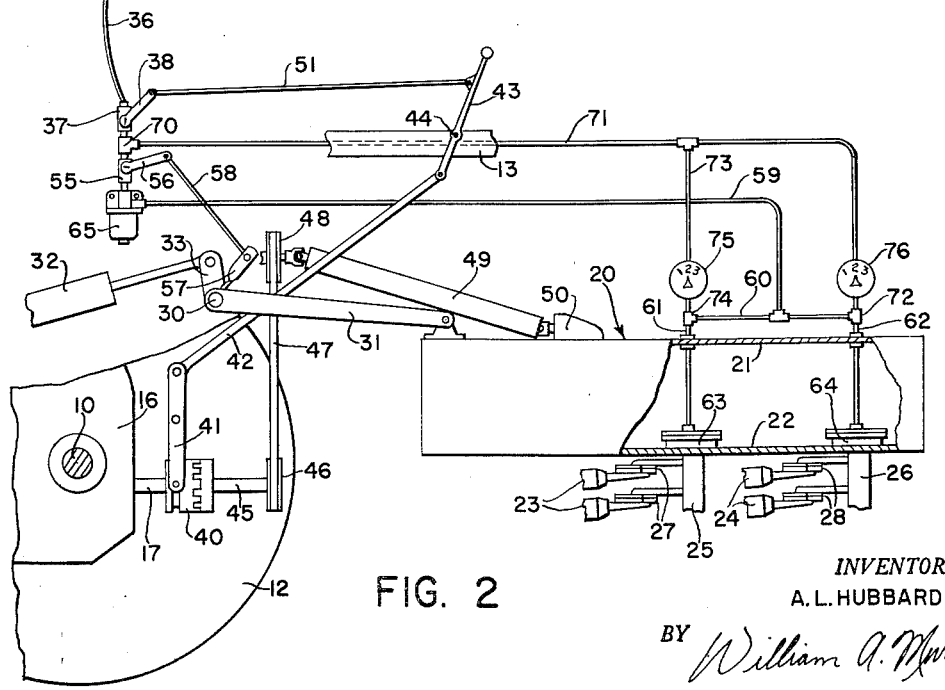
FIG. 2 is a schematic view of the control system for feeding the fluid to the moistener mechanism.

Referring now to FIG. 1, there is provided a main mobile frame including a transverse axle structure 10 supported on transversely spaced apart traction wheels 11, 12. The harvester frame also includes a laterally disposed platform 13 having an operator's seat 14 facing forwardly to a steering wheel 15. The main frame also includes a centrally located differential gear drive indicated in its entirety by the reference numeral 16, having a rearwardly projecting power take-off shaft, as indicated in representative form at 17 in FIG. 2.

The harvesting unit is of conventional type and is better shown and described in the aforementioned patents. However, it includes a main housing 20 which has at its top a pair of spaced apart laterally disposed plates 21, 22 of a laterally disposed compartment containing drive mechanism, not shown, for the various mechanisms in the housing. Contained within the housing 20 is a pair of picking drums having picking spindles 23, 24. As is conventional, the picking drums are disposed on opposite sides of a row of cotton plants and extend into the plants for picking cotton. Adjacent to the spindles 23, 24 are provided vertical columns 25, 26 which have laterally extending moistener arms and pads 27, 28 spaced on the order of and disposed about the spindles 23, 24 of the picking drums. As is conventional, the picking spindles 23, 24 normally move in a laterally disposed orbit and in each orbit the spindles contact the under surface of the pads 27, 28 for purposes of having juices and other trash collected in the harvesting operation removed from the surface of the spindles.

The picker unit housing is normally supported on the main frame of the harvester by means of a transverse rockshaft 30 having forwardly projecting lift arms 31 pivotally connected at their forward ends to the upper plate 22 of the housing 20. Hydraulic cylinder 32 is anchored to the harvester frame and extends to a rigid rock arm 33 fixed to the rockshaft 30 and operates through extension and retraction to rock the rockshaft 30. Movement of the rockshaft 30 in one direction raises the housing structure 20 and movement of the rockshaft in the opposite direction lowers the housing structure 20.

Also supported on the harvester main frame is a liquid or fluid tank 35 which normally contains the fluid or wetting agent fed to the moistener pads 27, 28. A fluid control system extends between the tank 35 and the pads 27, 28 and includes therein a main feed line or hose 36 which extends downwardly from the tank 35 to a first valve 37. The valve 37 has a control arm 38 attached thereto which opens and closes the valve 37 for purposes of shutting off or permitting the flow of fluid through the valve.

The harvester includes operating or drive mechanism which features a jaw clutch 40 supported on the driveshaft 17. One face of the jaw clutch is controlled by a lever 41 pivotally mounted on the frame of the harvester and controlled by a link 42. The link 42 is connected to the lower end of a control lever 43 pivotally mounted at 44 on the platform 13 of the harvester. A second shaft 45, axially coextensive with the shaft 17 has the opposite portion of the jaw clutch 40 mounted thereon. Consequently, to effect rotation of the shaft 45 the jaw clutch 40 is engaged. Fixed on the forward end of shaft 45 is a belt pulley 46 over which is mounted a belt 47 which drives a second pulley 48. Extending forwardly from the pulley 48 is the picker unit driveshaft assembly 49, the forward end of which extends into a bevel gear transmission 50, the latter having a vertical driveshaft, not shown, extending downwardly into the housing portion 20 to drive the harvesting mechanism. Again reviewing FIG. 2, it becomes apparent that the entire operating mechanism for the harvester is engaged by the lever 43 from the operator's station. A link 51 is connected to the lever 43 at a position above the pivot 44 and extends rearwardly to the outer end of the valve control arm 38. Again reviewing FIG. 2, it becomes apparent that as the clutch 40 is engaged, the control arm 38 will respond to open the valve 37 to permit flow of fluid through the valve.

A second valve 55 is in the feed line 36 beyond the first valve 37. The valve 55 has a control arm 56 mounted thereon. Fixed to the rockshaft 30 is a lever 57, the outer end of which is connected by a link 58 to the outer end of the control end 57. Reviewing FIG. 2, it becomes apparent that by raising the entire housing unit 20 by retracting the cylinder 32, the arm 57 will move in a counter-clockwise direction as will the control arm 56. This will cause a responsive action in the valve 55 to permit the flow of fluid. Therefore, by raising the housing unit 20, the flow of fluid through the valve 55 is permitted. Conversely, by lowering the housing 20, the flow of fluid is shut off.

Extending from the valve 55 is a fluid line 59. At the terminal end of the feed line 59 there is provided a fluid line 60 which feeds to a pair of vertical lines 61, 62 connected to fluid distributing mechanisms 63, 64 above and attached to the fluid columns 25, 26. A suitable filter 65 is provided for conventional filtering purposes in the line 59.

Connected to the main feed line 36 between the valves 37, 55 and by a T-joint 70 is a by-pass fluid line 71. The by-pass line 71 extends to and is connected by means of a T-joint 72 to the column feed line 62. A second feed line 73 is connected to the by-pass line 71 and extends downwardly to open into the line 61, a suitable T-joint 74 being provided to interconnect the line 60, 61 and 73. Provided in the lines 71, 73 and just prior to the joining with lines 61, 62 is a pair of metering valves 75, 76, each being manually adjusted to control the amount of fluid passing through the line 73 and through the terminal portion of the line 71. The fluid passing through the by-pass line 71, therefore, may be regulated or even shut off by suitably adjusting the metering valves 75, 76.

The fluid control system operates in the following manner. Often times it is desirable to flush the spindles 23, 24 at the end of the rows or while the harvester is being turned. If this is desired, the metering valves 75, 76 may be completely closed and consequently the only fluid flow will occur through the line 36 and the line 59 which feeds to the lines 60, 61, 62. Due to the responsive action of the housing structure 20 being raised, the valve 55, which permits the flow of fluid into the line 59 will occur only when the harvester is raised. From a practical standpoint, raising of the structure 20 will occur while turning at the end of the roll and flushing therefore occurs at that time. The valve 37 will be open so long as the clutch 40 is engaged.

Often times it will be desired to moisten the spindles 23, 24 throughout the entire harvesting operation. The metering valve 75, 76 may be adjusted to any desired flow of fluid and consequently when the harvesting unit is in operation due to the engagement of the clutch 40, the valve 37 will be open and the fluid will flow through the valves 75, 76. Should it be desired to flush the spindles at the end of the rows, the latter will occur automatically when the housing structure 20 is raised. Should it be desired not to flush the spindles at the end of the row, the link 58 may be disconnected and the valve control arm 56 adjusted manually to close and maintain closed the valve 55.

It will be noted that whether it is desired to meter the fluid to the spindles 23, 24 throughout the operation, or to flush the spindles only at the end of the rows or as the harvester turns, such may be done automatically merely by adjusting the suitable valves prior to beginning the harvesting operation. Once the valve system is set, then the entire harvesting operation may be done without further adjustment or controls.

While only one form of the invention has been shown, it should be recognized that other forms and variations will occur to those skilled in the art. Therefore, while the preferred form was shown and described in concise and detailed manner, it was not the intention to limit or narrow the invention beyond the broad concepts set forth in the appended claims.

What is claimed is:

1. A fluid control system for a cotton harvester having a fluid supply and a moistener mechanism, the cotton harvester being of the type having a harvester unit, adjustable means for raising and lowering the harvester unit and operating means associated with the harvester unit, said control system comprising: a main feed line from the fluid supply; a first valve in the feed line; connecting means between the first valve and said operating means responsive to open said first valve upon said harvesting unit being in operation; a second valve in the feed line beyond said first valve; feed line means extending from the second valve to the moistener mechanism; connecting means between the adjustable means and the second valve effective upon raising of the harvester unit to open the second valve and upon lowering the unit to close the second valve; a by-pass fluid line opening to the main feed line between the first and second valve and extending to the moistener mechanism; and a metering valve in the by-pass line for metering fluid passing through the by-pass line.

2. The invention defined in claim 1 in which the adjustable means for raising and lowering the harvesting unit is in the form of a rockshaft with a rockarm extending therefrom to suspend the harvester unit and the connecting means between the second valve and the adjustable means includes a link connected to the valve and rockarm effective upon rocking of the rockarm to open and close the valve.

3. The invention defined in claim 1 in which the operating means for the harvesting unit includes a clutch for driving mechanism of the harvester unit and a linkage for operating the clutch, and the connecting means between the first valve and the operating means includes a link extending between the valve and the linkage.

4. A fluid control system for a cotton harvester having a fluid supply and a pair of moistener mechanisms, the cotton harvester being of the type having a pair of harvester units disposed to normally operate from opposite sides of a row of plants, adjustable means connected to and for raising and lowering the harvester units and operating means for the harvester units, and said moistener mechanisms are supported by the respective harvesting units, said control system comprising: a main feed line from the fluid supply; a first valve in the feed line; connecting means between the first valve and said operating means responsive to open said first valve upon said harvesting units being in operation; a second valve in the feed line beyond said first valve; connecting means between the adjustable means and the second valve effective upon raising of the harvester unit to open the second valve and upon lowering the unit to close the second valve; feed line means extending from the second valve to the moistener mechanisms; a pair of by-pass fluid lines opening to the main feed line between the first and second valve and extending to the pair of moistener mechanisms; and a pair of metering valves in the by-pass lines for metering fluid passing through the respective by-pass lines.

5. A fluid control system for a cotton harvester having a fluid supply and a moistener mechanism, the cotton harvester being of the type having a harvester unit, adjustable means connected to and for raising and lowering the harvester unit and operating means for the harvester unit, said control system comprising: a main feed line from the fluid supply; a first valve in the feed line; connecting means between the first valve and said operating means responsive to open said first valve upon said harvesting unit being in operation; a second valve in the feed line beyond said first valve; feed line means extending from the second valve to the moistener mechanism; connecting means between the adjustable means and the second valve effective upon raising of the harvester unit to open the second valve and upon lowering the unit to close the second valve; and a by-pass fluid line opening to the main feed line between the first and second valve and extending to the moistener mechanism.

6. On a cotton harvester having a main frame, a harvesting mechanism, adjustable means raising and lowering the mechanism on the frame, a fluid supply, and a moistener mechanism associated with the harvesting mechanism, the improvement comprising: a feed line from the fluid supply to the moistening mechanism; a valve in the feed line; connecting means between the adjustable means and the valve effective upon raising of the harvesting mechanism to open the valve and upon lowering the harvesting mechanism to close the valve; and a by-pass fluid line opening to the aforesaid feed line in advance of the valve and extending to the moistener mechanism; and a metering valve in the by-pass line for metering fluid passing through the by-pass line.

7. On a cotton harvester having a main frame, a harvesting mechanism, adjustable means raising and lowering the mechanism on the frame, a fluid supply, and a moistener mechanism associated with the harvesting mechanism, the improvement comprising: a feed line from the fluid supply to the moistening mechanism; a valve in the feed line; connecting means between the adjustable means and the valve effective upon raising of the harvesting mechanism to open the valve and upon lowering the harvesting mechanism to close the valve; and a by-pass fluid line opening to the aforesaid feed line in advance of the valve and extending to the moistener mechanism.

8. On a cotton harvester having a main frame, a harvesting mechanism, adjustable means raising and lowering the mechanism on the frame, a fluid supply, and a moistener mechanism associated with the harvesting mechanism, the improvement comprising: a feed line from the fluid supply to the moistening mechanism; a valve in the feed line; and connecting means between the adjustable means and the valve effective upon raising of the harvesting mechanism to open the valve and upon lowering the harvesting mechanism to close the valve.

9. On a cotton harvester having a main frame, a harvesting mechanism mounted for raising and lowering on the frame, a fluid supply, and a moistener mechanism associated with the harvesting mechanism, the improvement comprising: a feed line from the fluid supply to the moistening mechanism; a fluid control device in the feed line; means connected to the device responsive to raising and lowering of the harvesting mechanism to control the fluid control device.

References Cited in the file of this patent
UNITED STATES PATENTS
2,795,917     Meier _____ June 18, 1957